July 20, 1954  G. E. SMITHBURN  2,684,022
CULTIVATOR MILLER AND TINE THEREFOR
Filed May 10, 1948
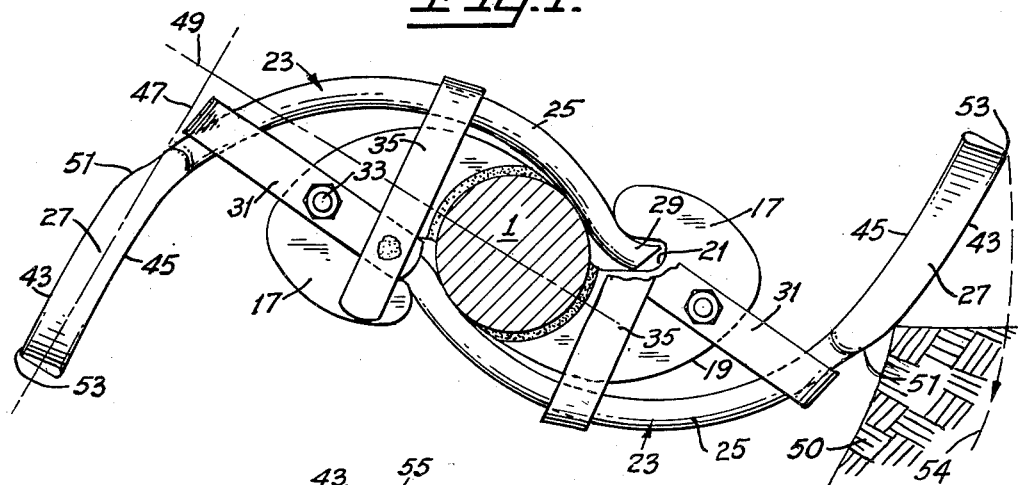
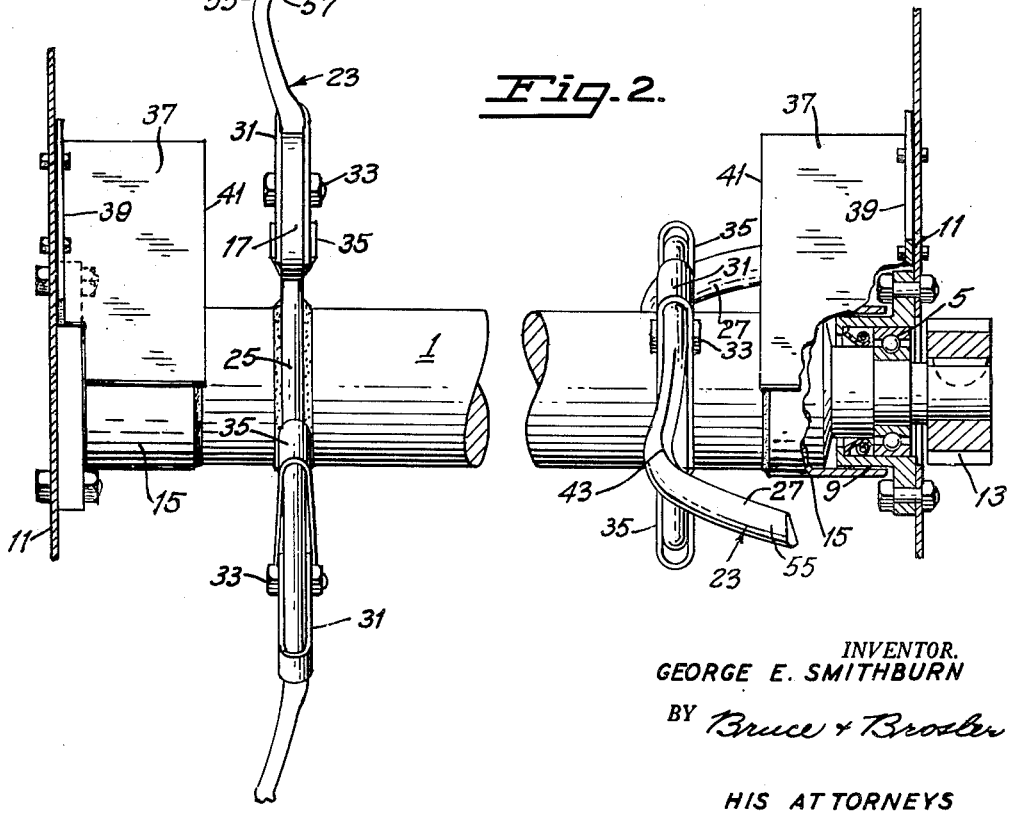
INVENTOR.
GEORGE E. SMITHBURN
BY *Bruce & Brosler*
HIS ATTORNEYS Patented July 20, 1954

2,684,022

UNITED STATES PATENT OFFICE 2,684,022

CULTIVATOR MILLER AND TINE THEREFOR

George E. Smithburn, Berkeley, Calif.

Application May 10, 1948, Serial No. 26,083

7 Claims. (Cl. 97—216)

My invention relates to cultivators and more particularly to a miller for a cultivator or the like and a tine therefor, the subject matter being of the general character illustrated and disclosed in my Patent 2,020,524, granted November 12, 1935.

Among the objects of my invention are:

(1) To provide a novel and improved miller for a cultivator or the like;

(2) To provide a novel and improved miller which can withstand considerable abuse without breakage of tines;

(3) To provide a novel and improved miller shaft and associated means for anchoring tines thereto;

(4) To provide a novel and improved miller of light weight but rugged construction;

(5) To provide a novel and improved miller which will not clog up in use;

(6) To provide a novel and improved miller having readily replaceable tines;

(7) To provide a novel and improved miller tine;

(8) To provide a novel and improved tine having inherent resiliency;

(9) To provide a novel and improved one-piece tine for a miller;

(10) To provide a novel and improved tine of simple construction;

(11) To provide a novel and improved tine and anchorage means therefor.

(12) To provide a tine and mounting therefor which will co-act in operation to provide an improved slicing action of the blade of the tine within the ground to thus obtain an optimum cutting and tilling action for a given applied power; to afford an automatic action enabling the blade to disentangle and disengage itself from obstructions it may encounter in the soil such as vines, wire, waterpipe, fence posts, rocks, etc., and provide an automatic self-sharpening of the blade in operation thereby greatly reducing the attention otherwise required to be given to the tines to keep their blades sharpened and in proper cutting condition.

Additional objects of my invention will be brought out in the following description of a preferred embodiment of the same taken in conjunction with the accompanying drawing wherein—

Figure 1 is a view in section through a miller of the present invention depicting my improved tine and means for mounting the same;

Figure 2 is a view longitudinally of the miller of Figure 1.

Referring to the drawings for a more detailed description of my invention in its preferred form as illustrated in the drawings, the miller involves a shaft 1 supported at its ends in end bearings 5 carried in bearing housings 9 mounted on the frame 11 of the cultivator or the like in which the miller is installed as a component part thereof. The shaft at one end projects beyond the frame and has keyed thereto, a pinion 13 for drive connection to a power unit such as a gasoline engine which is normally employed to power the cultivator or the like. A dust shield 15 at each end of the shaft is provided by a cylindrical collar welded about the shaft and extending over and enclosing the bearing housing.

At uniformly spaced intervals along the shaft are located mountings, each adapted to mount and support a pair of tines. Each such mounting means involves a pair of similar cam-shaped stress-limiting plates 17 mounted edgewise at diametrical positions on the shaft and welded thereto, the pairs being angularly displaced from each other to provide a balanced miller. Each such stress-limiting plate is shaped to offer a curved tine-engageable edge 19 merging on a tangent with the surface of the shaft 1. Also, each such plate is formed with an edge recess 21 in line with the corresponding tangent associated with the diametrically disposed stress-limiting plate.

The tines 23 adapted for mounting on the shaft, each include a curved resilient shank 25 of substantially circular section, terminating at one end in an integral ground engageable blade 27. The curve of the shank is shallower than that of the stress-limiting plate. In mounting the tine, the tail end 29 of the shank is inserted in the edge recess of one of the plates and is held against the shaft by a U-shaped clip 31 straddling both the shank of the tine adjacent the blade, and the other plate, to which plate, such clip is affixed as by a through bolt 33. The tail end of the shank is preferably turned up slightly to interlock with the complementary coacting shape of the notch or recess 21 to preclude the tine from being pulled out after the tine has been mounted as indicated.

Thus, in its unloaded condition, the tine will leave the shaft along substantially a tangent at a point in proximity to that point at which the stress plate merges with the shaft, and by reason of the difference in curvature between the tine and the stress-limiting plate, the tine in its unloaded condition will be in spaced relationship to its associated plate.

The value of the stress-limiting plate under these conditions lies, as its name indicates, in the fact that it functions to limit the maximum bending stress developing from point to point along the shank of the tine during loading. By so initially spacing the tine in its unloaded condition, the maximum stress progressively developing along the shank during flexing under loading conditions may be held to values below the breaking stress of the shank at any such points. As a result, probable breakage of a tine at points along the shank thereof has been reduced to negligibility.

In utilizing apparatus incorporating a miller, the tines are very often subjected to side stresses and strains, and this is particularlp true where the operator engages in a practice termed "woggling" which involves swaying of the cultivator from side to side while in operation. In order to avoid dislodging of the tines from their points of anchorage in the recesses of the stress-limiting plates, when exposed to such abuse, the length of the aforementioned clips is such as extend over the recesses, and to further assure against dislodgement of the tines under extreme conditions of side stress, I provide an additional clip 35 straddling the shank of the tine at substantially right angles to the aforementioned clip and of a length to also reach across the recess. The clip is preferably spot-welded to the first clip where it overlaps the same, to join the two clips into a single unit. The fact that the shanks of the tines are of substantially circular cross-section, imparts to each of them the same resiliency laterally that it has in the plane of its rotational movement. Consequently, any side stresses developed in the tines can readily be absorbed, and inasmuch as such side stresses as may be developed under these condition will hardly ever exceed the stresses to which the tines will normally be exposed, it can readily be appreciated that the tines of the present invention may be subjected to considerable abuse, without fracturing the same, and this has been demonstrated to be the case through actual application of the invention for its intended purpose.

Shank cross sections, other than circular, will exhibit sufficient lateral resiliency to absorb lateral stresses to which they may normally be exposed in use. Square or oval sections may be cited as examples.

Another and quite important feature of the present invention contemplates that the spread of the tine blade transverse to its plane of rotation, shall at least equal, and preferably exceed, the maximum width of the tine mounting in the same direction. I have discovered through actual use of my invention under operating conditions, that this relationship produces a very novel and unobvious result. In prior art devices, where the width or thickness of the tine mounting exceeds that of the blade of the tine, tall grass and weeds become entangled in the mountings and ultimately clog up the miller to the point where it becomes necessary to remove the clogging debris, in order to continue operations. In fact with some prior art machines, an implement or tool is provided for this very purpose.

By designing the tine and its mounting to have the relationship described above, tall grass or weeds in and adjacent the paths of the revolving tines, which would normally wrap themselves around the shaft, are uprooted and cast aside, with the result that the mill remains substantially free of such debris.

However, between the end tines and the frame, the tines are not effective to serve this purpose, for grass or weeds in these regions, which entangle with the end tines and their mountings, have their roots out of reach of such tines and consequently, in the absence of safeguards, will tend to wrap around the ends of the miller shaft.

I have solved this problem by disposing a guard plate 37 at each end of the shaft, substantially tangential to the collar 15 and inclined in the direction of rotation of the miller. It is supported in this position by providing the same with a flange 39 adjacent the frame whereby the plate may be bolted to the frame.

In operation, tall grass or weeds having roots in the paths over which the guard plates travel, will now, upon becoming entangled with the end tines and their mountings, be drawn taught along the edges and particularly the inside edges 41 of these plates to cause such grass or weeds to be severed. When thusly severed, they no longer can wrap themselves about the ends of the shaft to clog up the miller at these points.

One of the important features of the tine and its mounting is in the provision of lag in the relative rotational displacement of the blade 27. As will be seen from the drawing, the blade is of generally elongated form and is preferably, and as here shown, fashioned as an integral flattened portion of the shank 25 and is positioned edgewise to the plane of rotation with its sharpened leading edge 43 on the convex side of the curve of the shank 25. The flattening of the shank to fashion the blade is preferably such as to provide a substantially triangular shaped cross section with the sharpened edge 43 forming the apex and the trailing thickened heel end of the blade 45 forming the base. As viewed in the plane of rotation of Figure 1, the blade 27 is arranged generally as a longitudinal extension of the shank and, considering a clockwise rotation of the unit as viewed in Figure 1, it will be seen that the blade has lag with respect to the rotation of the unit. This lag may be illustrated by a line 47 representing the general longitudinal axis of the blade and the radius line 49 perpendicular thereto, it being noted that the line 47 (and the blade 27) lags behind the radius line 49 in the direction of rotation. This feature of rotative lag of the blade provides an important slicing action for the blade in that it effects the advance entry into the ground 50 of the end 51 of the blade adjacent the outer end of the shank with the progressive slicing entry of the more outwardly disposed portions of the blade and final entry of the outer distal tip 53 of the blade, as seen by the dashed line 54 representing the movement of the blade tip 53. If the blade were held rigidly at a constant radius during rotation, the outer side 55 would be ground by the cylinder of solid earth engaged thereby to eliminate the relief normally provided behind the cutting edge of the blade. In operation, however, the tine under load winds down upon the stress-supporting surface 19, thereby introducing further lag in the movement of the blade and reducing its radius of rotation. This has the effect of increasing the wear or grinding action upon the heel portion of the outer side of the blade, thus providing a sharpening action. Also cooperating in providing the automatic self-sharpening of the blade is the driving action of the blade in the ground, it being understood that the rotation of the miller shaft 1 and the cutting action of the blades 27 through the earth provide a forward driving thrust to the cultivator unit, the re-acting force of which falls over the outside surface 55 of the blades and more especially upon the heel portions of such surfaces. Also as the blades approach the bottom of their cutting stroke, the unwinding or spring back action of the tine keeps the pressure on the heel of the blade, which further assists in the self-sharpening action.

Accordingly, there is thus obtained a maximum cutting and tilling action for a given applied power.

Another feature of substantial importance given to the unit by the aforementioned lag of the blade is the tendency of the blade thus arranged to disentangle and disengage itself from obstructions it may encounter in the soil, such as vines, wire, waterpipe, fence posts, rocks, etc. This latter feature is also implemented by the coacting, resilient flexing of the tine which gives the blade an amount of independent movement for effecting its disentangling action.

As a further and very important feature of the present invention, the tine and its mounting coact in the operation of the unit so as to provide an automatic self-sharpening of the tine blade 27. As will be seen from Figure 2, the blade, and particularly the outer portion thereof, projects laterally from the plane of rotation so that there is a component of the blade length lying transversely to its direction of movement and which coacts with the variable radius of rotation of the blade provided by the resiliently flexible shank to cause a wearing or grinding off of the outer side 55 of the blade at the heel 45 of the blade. Preferably this offset relation of the blade is effected by forming the blade convexoconcave over its length as seen in Figure 2. With such an arrangement the tilled earth is thrown to the inner concave side 57 of the blade while the solid earth being cut engages and wears upon and accordingly grinds away the outer convex side 55 of the blade.

It will be apparent from the above disclosure of my invention, that the same will fulfill all the objects attributable thereto, and while I have disclosed such preferred form in considerable detail, I do not desire to be limited in my protection to such details except as may be necessitated by the appended claims.

I claim:

1. A miller for a cultivator or the like, comprising a shaft having a pair of stress-limiting plates disposed edgewise of said shaft in diametrically opposed relation, each such plate having a continuous curved tine-engageable edge merging substantially on a tangent with the surface of said shaft and an edge notch in each of said stress-limiting plates in line substantially with the corresponding tangential end of the diametrically opposite plate, a pair of tines, each including a curved resilient shank terminating at one end in an integral ground-engageable blade and at its tail end in a curved tip adapted to hook into such notch, and means for holding each such tine in spaced relationship to the tine-engageable edge of a stress-limiting plate and with its shank contacting said shaft as a fulcrum to lock said curved tip in the notch of the other of said plates.

2. A miller for a cultivator or the like comprising a shaft having a pair of stress-limiting plates disposed edgewise of said shaft in diametrically opposed relation, each such plate having a continuous curved tine-engageable edge merging substantially on a tangent with the surface of said shaft and an edge notch in each of said stress limiting plates substantially in line with the corresponding tangential end of the diametrically opposite plate, a pair of tines, each including a curved resilient shank terminating at one end in an integral ground-engageable blade and at its tail end in a tip adapted to slide into said edge notch, and means for holding each such tine in spaced relationship to the tine-engageable edge of a stress-limiting plate and with its shank contacting said shaft as a fulcrum to bind said tip in the notch of the other of said plates, said holding means including a pair of clips straddling such tine and plate and intersecting alongside such notch on each side thereof.

3. A rotary power driven ground tiller comprising, a tine and mounting means therefore adapted for rotation about an axis parallel to the ground to be tilled, said means being formed with a recess opening in an axial direction to a side of said means and with a surface extending in a generally radial direction from said recess, said tine being formed with an elongated resilient shank having an end mounted in said recess and having an adjacent portion formed to engage said surface, said shank extending outwardly frm said portion in diverging relation to said surface and projecting from said means for engagement with the ground to be tilled, said recess and shank end being formed to interlock for securing said tine to said mounting means, with said portion in engagement with said surface, and manually removable means engageable with said side of said first means to cover said recess for retaining said shank end from withdrawal from said recess in a direction parallel to said axis.

4. A rotary power driven ground tiller comprising, a plurality of tines and mounting means therefor adapted for rotation about an axis parallel to the ground to be tilled, said means being formed with a plurality of circumferentially spaced recesses opening in an axial direction to a side of said means and with a plurality of surfaces each extending in a generally radial direction from one of said recesses, each of said tines being formed with an elongated resilient shank having an end mounted in one of said recesses and having an adjacent portion formed to engage one of said surfaces and extending outwardly in diverging relation to said surface and projecting from said means for engagement with the ground to be tilled, said recesses and shank ends being formed to interlock for securing said tines to said mounting means, and a plurality of clip members secured to said mounting means and engageable with said shanks to retain said shank portions in engagement with said surfaces and extending over said side of said means in covering relation to said recesses for retaining said shank ends from withdrawal from said recesses in a direction parallel to said axis.

5. A one-piece tine for a rotary power driven ground tiller having a rotary tine holder formed with an edge recess comprising, an elongated curved resilient shank terminating at one end in a ground engaging blade and at its other end in a reversely curved tip formed for interlocking engagement in said recess for securing said tine against removal therefrom.

6. A ground tiller comprising, a rotary power driven tine holding means mounted for rotation about an axis and formed with a hooked shaped portion on one side of said axis and providing an edge recess opening in the general direction of said axis, a tine having an elongated resilient shank terminating in one end in a curved tip mounted in interlocking engagement in said recess and extending therefrom to the opposite side of said axis and being curved spirally outwardly from said axis so that the outer end of said tine will lag behind said shank in the direction of rotation, said outer tine end providing a ground engaging blade, said hooked shaped portion having a point of supporting engagement with said tine shank on the radial outermost side of said shank near its tip, and said tine holding means providing a second point of supporting engagement with the radial innermost side of said shank at a position spaced longitudinally from said first point in the direction of said blade whereby said spaced points of engagement support said tine for rotation with said means in the direction noted.

7. A ground tiller comprising a rotary power driven tine holder mounted for rotation and formed with a continuous outwardly spiraled tine-contacting edge terminating at its inner end in a reversely curved notch, and a one piece tine having an elongated curved resilient shank formed with a ground engaging blade at one end and an anchor tip at the opposite end, said tip being reversely curved for interlocking engagement in said notch and being supported therein on the radially outer side of said shank, said shank extending from said notch with its radially innermost side adjacent to but diverging from said tine-contacting edge whereby resistance encountered by said blade will displace said shank against said edge at progressive points therealong as said resistance increases.

References Cited in the file of this patent

UNITED STATES PATENTS

| Number | Name | Date |
|---|---|---|
| 374,130 | Pratt | Nov. 29, 1887 |
| 1,704,263 | Scheckler | Mar. 5, 1929 |
| 2,020,524 | Smithburn | Nov. 12, 1935 |
| 2,309,157 | Ariens | Jan. 26, 1943 |
| 2,366,571 | Riddle | Jan. 2, 1945 |
| 2,366,625 | Kelsey | Jan. 2, 1945 |
| 2,502,094 | Kelsey | Mar. 28, 1950 |
| 2,515,268 | Seaman | July 18, 1950 |

FOREIGN PATENTS

| Number | Country | Date |
|---|---|---|
| 18,046 | France | Nov. 10, 1913 |
| | (Addition to 458,607) | |
| 516,114 | Germany | Jan. 19, 1931 |
| 538,033 | Germany | Nov. 11, 1931 |
| 610,428 | Germany | Mar. 9, 1935 |